(12) United States Patent
Gupta et al.

(10) Patent No.: US 10,218,839 B2
(45) Date of Patent: Feb. 26, 2019

(54) METHODS, APPARATUS AND DEVICES FOR AUTHENTICATING A CALL SESSION

(71) Applicant: MASTERCARD INTERNATIONAL INCORPORATED, Purchase, NY (US)

(72) Inventors: Shweta Gupta, Maharashtra (IN); Rajesh Mahalle, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/729,302

(22) Filed: Oct. 10, 2017

(65) Prior Publication Data

US 2018/0103144 A1 Apr. 12, 2018

(30) Foreign Application Priority Data

Oct. 12, 2016 (SG) .............................. 10201608532P

(51) Int. Cl.
*H04M 1/56* (2006.01)
*H04M 15/06* (2006.01)
(Continued)

(52) U.S. Cl.
CPC ....... *H04M 3/42059* (2013.01); *H04M 3/382* (2013.01); *H04M 2203/6045* (2013.01); *H04M 2203/6081* (2013.01)

(58) Field of Classification Search
CPC ........... H04M 2203/2027; H04M 1/57; H04M 2207/12; H04M 3/42042; H04M 3/42068; H04M 3/42314; H04M 1/663; H04M 1/667; H04M 3/38; H04M 3/42323; H04M 3/426; H04M 2201/18; G06K 15/1849; G06K 15/1857; G07B 17/0008; G07B 2017/00072; H04L 5/1079
(Continued)

(56) References Cited

U.S. PATENT DOCUMENTS 5,901,209 A * 5/1999 Tannenbaum ..... G07B 17/0008
379/111
6,038,305 A 3/2000 McAllister et al.
(Continued)

*Primary Examiner* — Binh Kien Tieu
(74) *Attorney, Agent, or Firm* — Armstrong Teasdale LLP

(57) ABSTRACT

Methods and apparatus for authenticating a calling party in respect of a call session are disclosed. The call session is carried out over a communications network between a first communication terminal associated with the calling party and a second communication terminal associated with a called party. The calling party is associated with an organization and the method includes retrieving contact information of one or more calling parties from a database in communication with the server, the contact information including, for each said calling party, an association between a phone number of the first communication terminal and an identity of the associated organization of the calling party, and transmitting the contact information to the second communication terminal, to cause information representing the identity of the associated organization to be displayed by the second communication terminal in response to the second communication terminal receiving an incoming call from the phone number.

20 Claims, 7 Drawing Sheets

(51) Int. Cl.
*H04M 3/42* (2006.01)
*H04M 3/38* (2006.01)

(58) Field of Classification Search
USPC ............ 379/142.01, 142.05, 142.06, 142.17,
379/201.01, 201.05, 201.08, 201.09,
379/201.11, 201.12, 201.02
See application file for complete search history.

(56) References Cited

U.S. PATENT DOCUMENTS

| | | | | |
|---|---|---|---|---|
| 6,934,374 | B2 * | 8/2005 | Muranaka | H04L 63/101 |
| | | | | 379/142.05 |
| 6,952,468 | B2 * | 10/2005 | Lee | H04M 3/42323 |
| | | | | 379/142.06 |
| 7,085,257 | B1 | 8/2006 | Karves et al. | |
| 8,290,130 | B2 | 10/2012 | Cheon et al. | |
| 8,379,818 | B2 * | 2/2013 | Arsenault | H04M 3/42042 |
| | | | | 379/142.06 |
| 8,494,134 | B2 * | 7/2013 | Clark | H04M 3/42238 |
| | | | | 379/142.04 |
| 8,817,961 | B1 | 8/2014 | Sterman | |
| 9,264,539 | B2 | 2/2016 | Lin | |
| 9,686,393 | B1 * | 6/2017 | Cai | H04M 1/575 |
| 2002/0176554 | A1 * | 11/2002 | Moss | H04M 3/42042 |
| | | | | 379/142.01 |
| 2007/0293205 | A1 * | 12/2007 | Henderson | H04M 1/576 |
| | | | | 455/415 |
| 2008/0295159 | A1 * | 11/2008 | Sentinelli | G06F 21/34 |
| | | | | 726/6 |
| 2013/0159194 | A1 * | 6/2013 | Habib | G06F 21/32 |
| | | | | 705/66 |
| 2015/0072664 | A1 * | 3/2015 | Matsumura | H04Q 3/60 |
| | | | | 455/414.1 |
| 2016/0112562 | A1 * | 4/2016 | Krack | H04M 3/5166 |
| | | | | 379/189 |

* cited by examiner

METHODS, APPARATUS AND DEVICES FOR AUTHENTICATING A CALL SESSION

CROSS REFERENCE TO RELATED APPLICATIONS

This patent application claims priority to Singapore Application No. 10201608532P filed on Oct. 12, 2016, the disclosure of which is incorporated by reference herein in its entirety as part of the present application.

BACKGROUND

The present disclosure relates to methods, apparatus and devices for authenticating a call session, and in particular for authenticating a calling party of the call session over a communications network between a first and second communication terminal.

Virtual banking such as online banking and phone banking brings tremendous convenience to bank customers, since visits to the physical bank branches in person are no longer necessary for certain transactions with the bank. Similarly, telemarketing has also enhanced customer's accessibility to various services including financial services. However, the channel of telephone communication also increases risks of fraud. When a bank customer (i.e. a called party) receives a call from a bank representative (i.e. a calling party), usually there is no way for the customer to verify the true identity of the caller. This may lead to the called party divulging sensitive private information and/or financial information on a mistaken belief of the identity of the calling party, which may cause damages and losses to the called party, for example, in case of misuse or fraudulent use of such information.

Although sometimes the caller's line number and other information such as a geographic location (i.e. city, province or state at which the phone number was registered) and the subscriber's telecommunication network can be identified, such information serves limited purposes in helping the customer verifying the true identity of the calling party. In addition, many financial institutions engage services from third party vendors for certain marketing and sales activities, such as enrolling new credit card customers via phone calls. Currently, there is no existing process for the customers to verify if an incoming call session is in fact initiated by an agent is truthfully authorized by a bank.

Therefore, it is desirable to provide an improved method and apparatus for authenticating a calling party of a call session over a communications network between two communication terminals.

BRIEF DESCRIPTION

In general terms, the present disclosure proposes automatically obtaining, from a database, contact information of one or more calling parties which contains, for each calling party, an association between a phone number and an identity of an associated organization of the calling party, so as to cause the identity of the associated organization to be displayed by a communication device in response to the communication device receiving an incoming call from a given said phone number.

A first aspect of the present disclosure provides a method for authenticating a calling party in respect of a call session over a communications network between a first communication terminal associated with the calling party and a second communication terminal associated with a called party. The calling party is associated with an organization, and the method is performed by a server. The method includes retrieving contact information of one or more calling parties from a database in communication with the server, the contact information including, for each the calling party, an association between a phone number of the first communication terminal and an identity of the associated organization of the calling party, and transmitting the contact information to the second communication terminal, to cause information representing the identity of the associated organization to be displayed by the second communication terminal in response to the second communication terminal receiving an incoming call from a given the phone number.

As used in this document, the term phone number refers to a phone line number assigned to or otherwise associated with a communication terminal in respect of a call session carried out over a telephony network. The telephony network may be a landline network, a wireless network, a private network, or an Internet Protocol (IP) telephony network. Typically, phone line may be with mobile phone lines, landlines, Multiprotocol label Switching (MPLS) lines, IP calling connections (e.g. via VoIP telephony), phone line extension, or the like. Accordingly, the phone number may include a mobile line number, a landline number, a MPLS line number, phone extension number, etc. For another example, the phone numbers includes IP calling number such as the number assigned to the calling party in respect of an outgoing call employing VoIP. The first communication terminals may therefore include mobile phones, telephones, tablets, laptop computers, or any other communication devices which are capable of delivery voice sessions over a communication network.

This allows for the identity of the associated organization of the calling party to be communicated to the called party. Accordingly, the called party will be able to verify if an incoming call is from an authorized caller representing the organization. This may reduce the risks of called party from being misled or deceived by scam calls. Typically, the database is established and maintained by the organization itself or other trusted organizations or government authorities which ensure that the stored contact information is verified and/or trustworthy.

Typically, the information is displayed in a form of text which includes organization's name. In another example the information is displayed in a form of a graphic representation which is indicative of the organization's identity, such as an image or a logo representing an identity of the organization. Alternatively, a seal or symbol which identifies that the caller has been verified may be displayed. The seal or symbol may include identity information of the organization.

In some embodiments, the communication terminal may be configured to play a designated ring-tone for calls which are determined to be associated with the organization. The ring-tone could be selected by the organization, or by the user of the communication terminal. Information associated with the ring tone may be stored by the communication terminal.

In one embodiment, the method may further include-receiving an electronic request from a said calling party and transmitting, in response to the electronic request, a one-time-password (OTP) to the calling party.

In one embodiment, the method may further include transmitting a notification including a corresponding OTP to the second communication terminal. In some embodiments, the notification may include a time duration for which the OTP is valid. The notification may further include the information representing the identity of the associated organization. The corresponding OTP matches with the OTP so that they allow one of the recipients to identify and/or verify the other recipient of the OTP. Typically, the corresponding OTP is identical to the OTP.

In one embodiment, the method may further include retrieving contact information of a plurality of calling parties which are associated with a same organization. Alternatively or additionally, the method may include retrieving contact information of a plurality of calling parties which are associated with different organizations.

In one embodiment, the method may further include retrieving updated contact information of the one or more calling parties from the database and transmitting the updated contact information to the second communication terminal at a pre-defined time interval.

In one embodiment, the identity of the associated organization may further include an identity of a division of the organization.

In one embodiment, the method may include causing an address book of the second communication terminal to store the contact information of the one or more calling parties. The address book is an electronic database of a communication device for storing entries of contacts of the user. Each contact entry may include a few standard information fields such as the first name, last name, company name, address, telephone number, e-mail address, fax number, mobile phone number, etc. The content of the information fields may be manually created and/or modified by the user.

In some embodiments, the method is performed by a server operated by a bank. The database may include contact information associated with the bank's communication terminals for making outgoing calls.

In other embodiments, the method is performed by a server operated by a payment network system or service provider such as MasterCard, and the server may store a database including contact information of a plurality of banks and/or other financial institutions. In some example, it may store contact information of other types of organizations such as the government organizations.

A second aspect of the present disclosure provides an apparatus for authenticating a calling party in respect of a call session over a communications network between a first communication terminal associated with the calling party and a second communication terminal associated with a called party. The calling party is associated with an organization. The apparatus has a processor and a data storage device storing program instructions being operative to cause the processor to carry out any one of the method described above.

In some embodiments, the apparatus may include the database and the instructions are operative to cause the processor to update the database to store the updated contact information.

The present disclosure further provides a server software product, such as at a time when it is stored in a non-transitory form on a tangible data storage device. The data storage device may be within the server, or it may be a database from which the server is able to download the software. In particular, there is proposed a server program product including computer program instructions which is operative, when implemented by a processor of a server, to cause the processor to perform any one of the methods described above.

A third aspect of the present disclosure provides a method for authenticating a calling party in respect of a call session over a communications network between the calling party and a called party. The calling party is associated with an organization. The method is performed by a communication terminal associated with the called party and the communication terminal has a user interface. The method includes receiving, from a database, contact information of one or more calling parties, said contact information including, for each said calling party, an association between a phone number of a communication terminal associated with the calling party and an identity of the associated organization of the calling party, and in response to receiving an incoming call from a given said phone number, determining the identity of the organization using the association, and displaying information representing the identity of the organization via the user interface.

Typically, the information is displayed in a form of text which includes organization's name. In another example the information is displayed in a form of a graphic representation which is indicative of the organization's identity, such as an image or a logo representing an identity of the organization. Alternatively, a seal or symbol which identifies that the caller has been verified may be displayed. The seal or symbol may include identity information of the organization.

In some embodiments, the communication terminal may be configured to play a designated ring-tone for calls which are determined to be associated with the organization. The ring-tone could be selected by the organization, or by the user of the communication terminal. Information associated with the ring tone may be stored by the communication terminal.

In some embodiments, the method may further include receiving a notification for authenticating the calling party, said notification comprising a one-time-password (OTP) and the identity of the organization.

In some embodiments, the method may further include receiving the notification prior to receiving the incoming call.

In some embodiments, the method may further include storing the contact information of the one or more calling parties in an address book of the communication terminal associated with the called party. In one example, the address book may store other entries of contacts manually created by the called party. In another example, a separate address book may be added in the communication terminal for storing the contact information. In some embodiments, the address book may store the ring-tone information associated with the calling party and/or the organization.

A further aspect of the present disclosure provides a communication device. The communication device includes a processor and a data storage device storing program instructions, the program instructions being operative to: receive, from a database, contact information of one or more parties, said contact information including, for each said party, an association between a phone number of a further communication device associated with the party and an identity of an associated organization of the party, and in response to receiving an incoming call from a given said phone number, determine the identity of the associated organization, and display information representing the identity of the organization via the user interface.

In some embodiments, the program instruction may be operative to cause the processor to receive a notification for authenticating the party making the incoming call, said notification including a one-time-password (OTP) and the identity of the organization.

In some embodiments, the program instruction may be operative to cause the processor to store the contact information of the one or more calling parties in an address book of the communication device. In one example, the address book may store other entries of contacts manually created by the called party. In another example, the program instructions may cause a separate address book be added in the communication terminal for storing the contact information. The separate address book may be dedicated for storing contact information associated with identified trusted callers.

The present disclosure further provides a method for authenticating a calling party in respect of a call session between the calling party and a called party. The calling party is associated with an organization, and the method is performed by a server. The method includes receiving an electronic request from a calling party, said electronic request and a communication terminal associated the called party, transmitting, in response to the electronic request, a notification including a one-time-password (OTP) to the communication terminal, and transmitting a corresponding OTP to the calling party for authenticating the calling party in respect of an outgoing call made to the called party.

Using the OTPs may allow the called party to authenticate the caller identity more directly, as it helps preventing caller ID spoofing. This aspect may be performed independently of, or in combination with other aspects (such as the first and/or other earlier described aspects) of the present disclosure.

In some embodiments, the OTPs may be automatically set to expire after a pre-defined time duration, such as after one hour.

In one embodiment, the electronic request may identify a communication terminal associated with the calling party, and the method may include transmitting the corresponding OTP for authenticating the outgoing call made to the called party by the communication terminal associated with the calling party.

There is also provided an apparatus configured to perform any one of the methods described above. In particular, the apparatus has a processor and a data storage device storing program instructions being operative to cause the processor to carry out any one of the method described above.

There is further provided a server software product, such as at a time when it is stored in a non-transitory form on a tangible data storage device. The data storage device may be within the server, or it may be a database from which the server is able to download the software. In particular, there is provided a server program product including computer program instructions which is operative, when implemented by a processor of a server, to cause the processor to perform any one of the methods described above.

The present disclosure also provides a method for authenticating a calling party in respect of a call session over a communications network between the calling party and a called party. The calling party is associated with an organization and the method is performed by a first communication terminal associated with the calling party. The method includes transmitting an electronic request to a server, said electronic request identifying a second communication terminal associated with the called party and causing a notification for authenticating the calling party to be transmitted to the second communication terminal, said notification including a one-time-password (OTP) and information representing an identity of the associated organization, and receiving, from the server, the one-time-password (OTP) for authenticating the calling party in respect of an outgoing call made to the called party.

In some embodiments, the method may further include making the outgoing call using the first communication terminal.

In some embodiments, the method may further include verifying an identity of the calling party with the server, and receiving the OTP upon the verification being successful.

Another further aspect of the present disclosure provides a communication device for authenticating a calling party in respect of a call session over a communications network between the calling party and a called party, wherein the calling party is associated with an organization, the communication device being configured to: transmit an electronic request to a server, said electronic request identifying a communication device associated with the called party and causing a notification for authenticating the calling party to be transmitted to the communication device associated with the called party, said notification including a one-time-password (OTP) and information representing an identity of the associated organization, and receive, from the server, the one-time-password (OTP) for authenticating the calling party in respect of an outgoing call made to the called party.

In some embodiments, the communication device may be further configured to verify an identity of the calling party with the server, and to receive the OTP upon the verification being successful.

The present disclosure further provides a software product, such as at a time when it is stored in a non-transitory form on a tangible data storage device. The data storage device may be within a communication device of a user, or it may be a database from which the communication device is able to download the software. In particular, there is provided a program product including computer program instructions which is operative, when implemented by a processor of a communication device, to cause the processor to perform any one of the methods described above.

All operations of the proposed methods may be-performed automatically. The term "automatic" is used in this document to refer to a process which is performed substantially without human involvement, save possibly for initiation of the process.

Within the scope of the disclosure it is expressly intended that the various aspects, embodiments, examples, and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the disclosure will now be described by way of example only with reference to the following drawings, in which.

DETAILED DESCRIPTION

Figure 1:
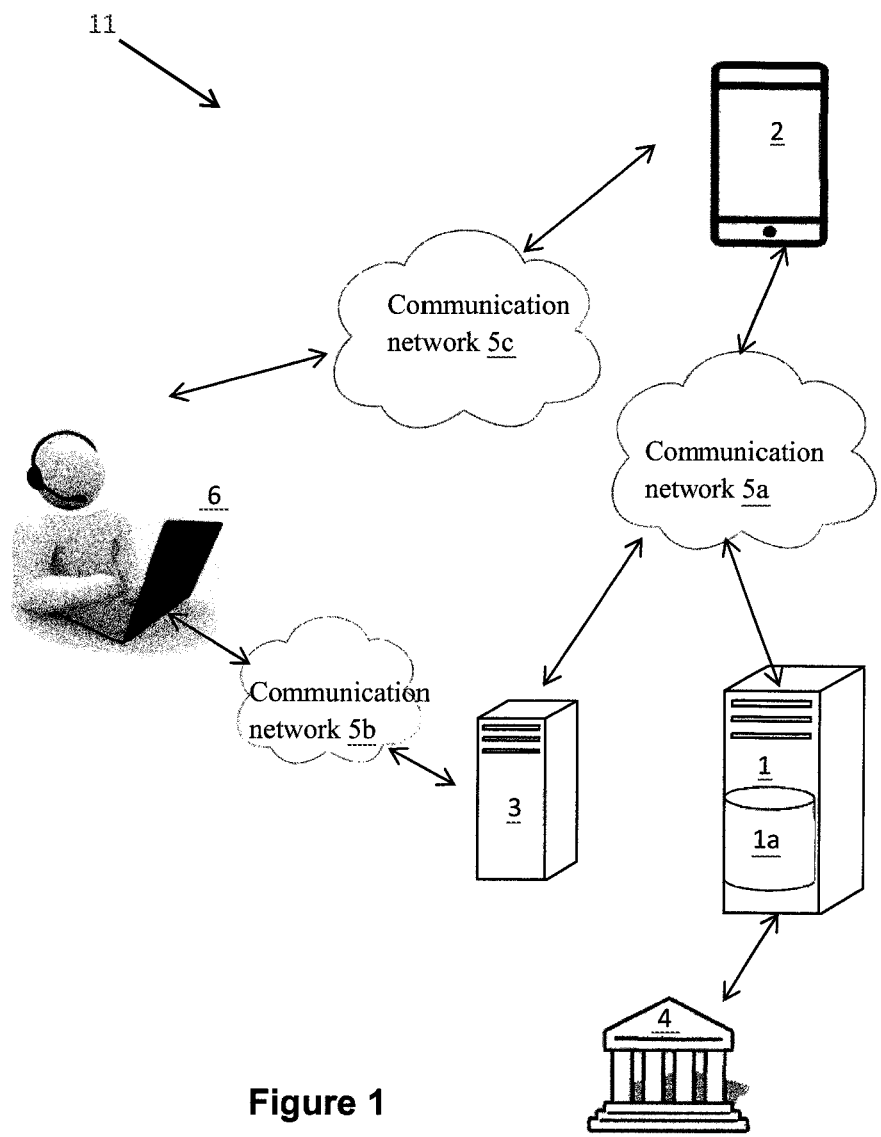
FIG. 1 shows a call authentication network which is suitable for performing a method according to the present disclosure.
Figure 2:
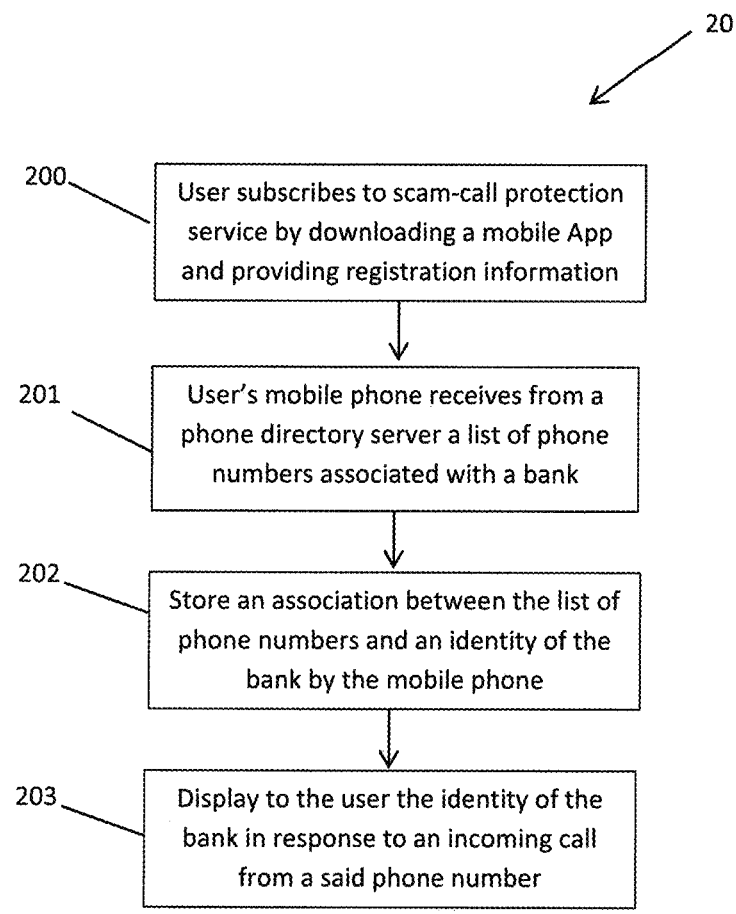
FIG. 2 is a flow diagram of an exemplary method according to one embodiment of the present disclosure.
Figure 4:
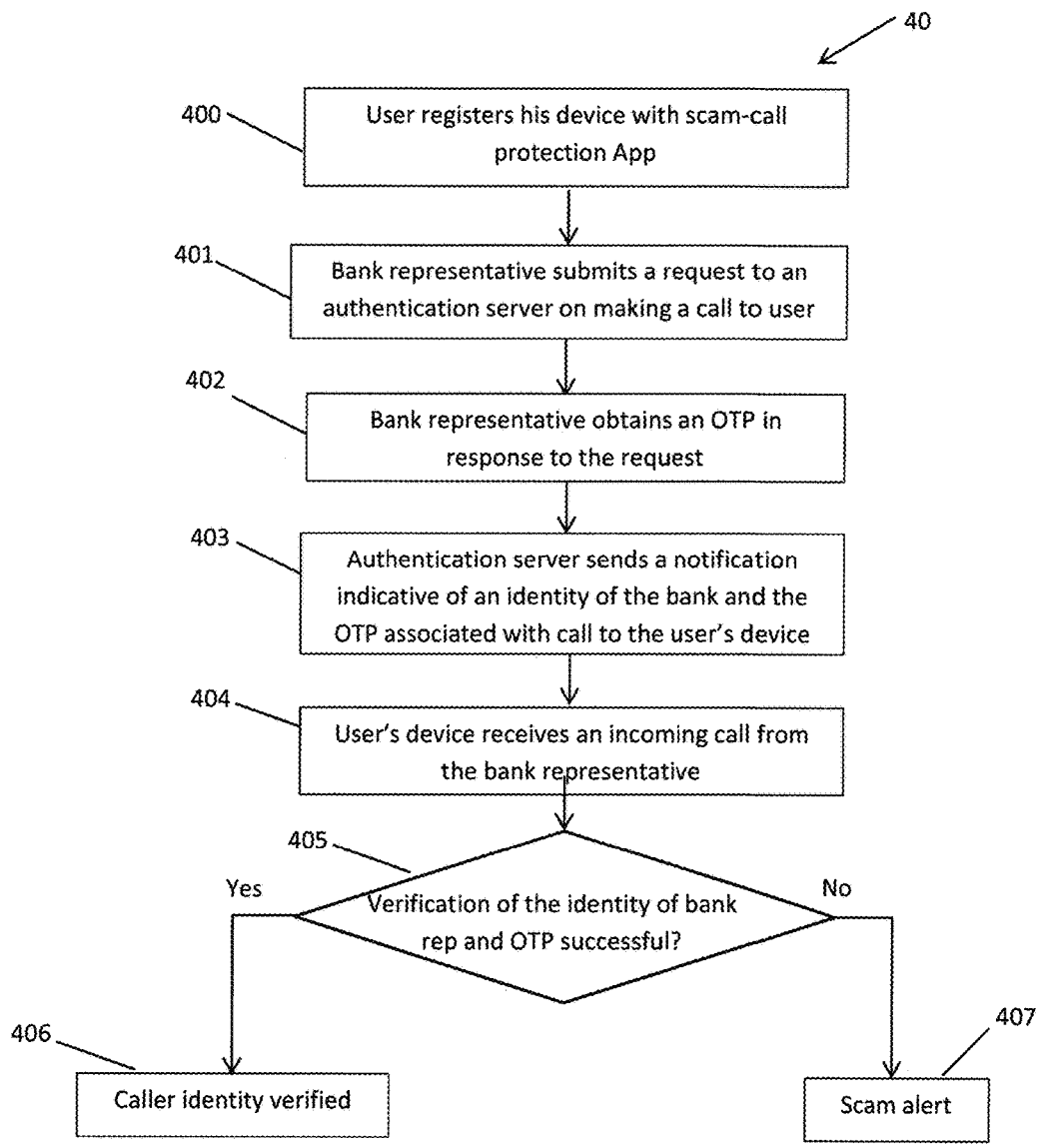
FIG. 4 is a flow diagram of an exemplary method according to another embodiment of the present disclosure.

Referring to FIG. 1, a call authentication network 11 is shown which is suitable for performing methods of embodiments as illustrated by FIG. 2 and FIG. 4.

The call authentication network 11 includes a phone directory server 1 communicatively coupleable to a user' communication device such as a mobile phone 2 via a communication network 5a. The phone directory server 1 stores a phone directory database 1a including contact information associated with a bank 4. The phone directory server 1 is configured to retrieve the contact information from the phone directory database 1a and transmit the contact information to the mobile phone 2. The contact information may include a list of phone line numbers associated with a plurality of registered communication terminals of the bank 4. For the sake of simplicity, only one of the registered communication terminals 6 is illustrated in FIG. 1. The plurality of phone lines numbers may include phone numbers associated with mobile phone lines, landlines, Multiprotocol label Switching (MPLS) lines, IP calling (e.g. VoIP telephony), and/or line extension. The registered communication terminals may be communication terminals designated by the bank for making outgoing calls to external parties such as existing customers or potential customers of the bank. The communication terminals may include mobile phones, telephones, tablets, laptop computers or any other communication devices which are capable of delivery voice sessions over a communication network.

According to one embodiment, the plurality of registered communication terminals are telephones associated with bank officers, customer-service representatives or other staff of the bank. Additionally or alternatively, the plurality of registered communication terminals may also include communication devices with any other personnel or entity authorized by the bank to perform communication on behalf of the bank, for example, a third party engaged by the bank for promoting financial services or other business of the bank, such as a vendor for enrolling new credit card customers for the bank. According to a particular example, for communication terminals associated with the third party vendor, dedicated MLPS 1.1 line may be added between the bank 4 and the third party with necessary certificate authority information. A list of phone line numbers of the plurality of the registered communication terminals is maintained by the bank 4.

In this example, the contact information further includes information representing an identity of a bank such as a name of the bank, a name of a sub-division of the bank, a name of the bank's representative, a type of the phone line (e.g. main, auxiliary, IP calling etc.) or communication terminal that is associated with the phone number. The information representing the identity of the bank may alternatively or additionally include an image or a logo of the bank. The contact information may further include other business information relating to the bank such as its operating hours and address. The phone directory database 1a may store one or more of the above information in relation to each of the registered communication terminal of the bank 4, in additional to its associated phone number. The phone directory database 1a may be periodically updated and modified by the phone directory server 1 to maintain records of the contact information. The phone directory server 1 may be configured to automatically transmit the updated contact information to the user's mobile phone 2 at regular time intervals.

As illustrated by FIG. 1, the call authentication network 11 may optionally include an authentication server 3, which is communicating with the user's mobile phone 2 via the communication network 5a. The authentication server 3 is in further communication with the plurality of registered communication terminals (only one registered communication terminal 6 is shown in FIG. 1) via a communication network 5b. As will be described in more detail, the authentication server 3 is configured to generate a one-time-password for authenticating an identity of the calling party that makes outgoing calls via the registered communication terminal 6 to the user's mobile phone 2.

As will also be understood by a skilled person in the art, each of the various devices in the call authentication network 1 has a communication module such as wireless interface for two-way communication between one and another via a communication network. The communication network 5a, 5b could be any types of network, for example, virtual private network (VPN), the Internet, a local area, a wide area network (LAN and/or WAN), 3G, and/or 4G, and so on.

A call session between the mobile phone 2 and the registered communication terminal 6 may be established over a communication network 5c. The communication network 5c may be any type of communication network which allows delivery of voice communications. Typically, the communication network 5c is a telecommunication network such as a cellular telecommunication network. In this embodiment, the communication network 5c is a Global System for Mobile Communications (GSM) network which allows a telecommunication session to be established between a GSM modem of the mobile phone 2 and the registered communication terminal 6. It will be understood that other telecommunication network employing different communication standards or protocols may be used such as cellular telecommunication protocols such as code division multiple access (CDMA) or long-term evolution (LTE) may be used. In some embodiments, the communication network 5c is a virtual private network (VPN), the Internet, a local area, a wide area network (LAN and/or WAN), 3G, and/or 4G, and so on. In those embodiments, the call session may be established over an internet connection, such as via Voice over Internet Protocol (VoIP).

Exemplary methods of the present disclosure will now be illustrated with reference to FIGS. 2 and 4 in which the operations are enumerated. It should also be noted that enumeration of operations is for purposes of clarity and that the operations need not be performed in the order implied by the enumeration.

Referring to FIG. 2, an exemplary method 20 according to the present disclosure is illustrated. At step 200, a user subscribes to scam-call protection service and completes registration with the service provider, for example, the bank 4. This may be performed by the user downloading a new mobile application and installing the application on the operating system of the mobile phone 2. Alternatively, the service may be made available as an additional functionality for existing mobile applications, such as online-banking mobile applications offered by the bank 4.

In this example, a one-time registration step is carried out with the phone directory server 1. The user may complete registration by providing basic information of the user such as the user's full name, residential address, e-mail address, and/or mobile phone number. The user may be required to verify certain information provided, such as the mobile phone number. Alternatively, the user may use his or her existing online banking user information or credentials to complete the registration.

At step 201, the mobile phone 2 receives from the phone directory server 1 contact information associated with the bank 4. In one example, the mobile phone 2 is configured to download automatically from the phone directory 1 to obtain a list of phone numbers corresponding to the registered communication terminals designated by the bank 4 periodically.

At step 202, the list of phone numbers are stored by the mobile phone 2. The list of phone numbers may be stored locally as new entries in the address book of the mobile phone 2, or a separate address book. According to a particular example, the mobile application may be configured to synchronize entries stored by the address (e.g. the separate address book) with the phone directory server 1 automatically. The entries include the phone numbers and the corresponding bank name in the address book of the mobile phone 2. The entries may also include another form of data representing an identity of the bank, such as a graphic representation which is indicative of the organization's identity. In one example, the entries store an image, photo, or logo representing an identity of the organization. In a further example, a seal or symbol which identifies that the caller has been verified may be stored in association with the bank. The seal or symbol may include identity information of the bank. The seal or symbol may help the user to identify the caller or to understand that the caller's identity was verified.

The phone number and/or the organization may also be associated with a designated ring-tone such that the ring-tone is played in response to an incoming call from the phone number and/or organization. For example, the ring-tone may be a sound track associated with the bank, such as a sound trademark of the bank or a melody used in media advertising material of the bank. This may allow the user to easily understand that the caller is verified caller and/or be informed of the identity of the bank.

In some embodiments, the entries may be associated with a pre-defined priority level. For example, the automatically downloaded entries may be associated with a lower priority level than entries in the address book which were manually created by the user himself or herself. On the other hand, the automatically downloaded entries may be associated with a higher priority level than entries saved from other software which detects caller ID information. The user may be allowed to update the address book based on the priority level associated with the contact information, in case of conflicting entries. For example, if the phone number already exists in the address book which is associated with a different contact name previously created by the user (which is associated with a higher priority), the contact name associated with the automatically downloaded entry will not replace that of the existing entry. In another embodiment, if the phone number already exists in the address book, the user may be prompted to choose whether or not to overwrite the existing entry including, for example, updating the stored contact name associated with the phone number. In a variant, the mobile phone 2 is configured to display the caller information based on the priority level of stored entries in case of conflicting entries. In another example, the list of phone numbers and the associated bank name may be stored within the mobile application running on the mobile phone 2, other than in the address book of the phone. For example, the entries stored within the mobile application may by default be associated with a lower priority level than those in the mobile phone's address book.

At step 203, upon receiving an incoming call from a registered communication terminal associated with one of the phone numbers, identity information of the bank is displayed to the user via a user interface, typically a graphic user interface, of the mobile phone 2. As will be understood by a skilled person in the art, the step may involve a process in which a telecommunication unit of the mobile phone 2 detects a phone number associated with the calling party, and that a processing unit of the mobile phone 2 searches the stored contact information in the address book for a matching entry and thereby causing some or all of the stored information fields corresponding to the matching entry to be displayed in place of (or in addition to) the phone number of the calling party. In another example, the process may involve searching for contact information stored by the mobile application of the mobile phone 2. In some examples, the ring-tone associated with the contact will be played by the mobile phone 2.

Figure 3:
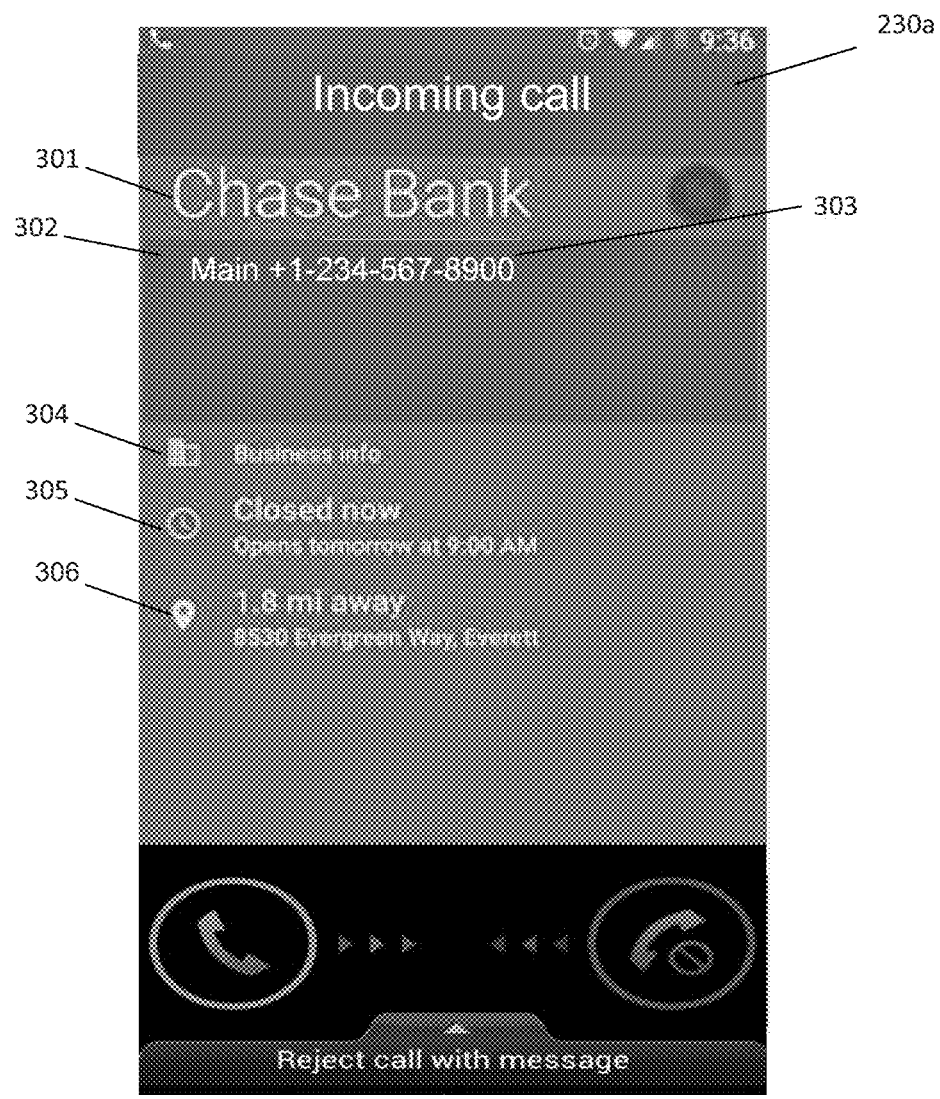
FIG. 3 illustrates information displayed by a graphic user interface of the communication device in response to an incoming call according to one embodiment of the present disclosure.

FIG. 3 illustrates information displayed by a graphic user interface 230*a* of the mobile phone 2 in response to an incoming call according to an embodiment. The information fields include a name of the bank 301, a type 302 of the telephone line (e.g. main, auxiliary, etc.), a phone number 303, and business information 304 relating to the bank including information relating to its operating hours 305 and address 306. Such information is typically made available to the mobile phone 2 prior to the user accepting the incoming call, for example, the information is displayed to by the mobile phone 2 during a call signaling or ringing process prior to the call connection being successfully established. In another embodiment, a graphic representation which is indicative of the organization's identity, such as an image or a logo representing an identity of the organization may be displayed in addition, or as an alternative to the name of the bank 301. Alternatively, a seal or symbol which identifies that the caller has been verified may be displayed. The seal or symbol includes identity information of the organization.

Turning to FIG. 4, which illustrates a flow of another exemplary method 40 of the present disclosure. The method 40 is described with respect to a further server, the authentication server 3, which provides further authentication of the identity of the calling party in respect of a call session. It will also be understood that in a variant, the method 40 may be performed independently of or in combination with method 30. In other words, the functionality provided by the phone directory server 1 may be optional. It will also be understood that in a further variant the authentication server 3 may be integrated with the phone directory server 1 in certain embodiments, as will described in more detail later with respect to a variant embodiment shown in FIG. 5.

At step 400, a user registers his mobile phone device with a scam-call protection application. This step may be performed in a way similar to that of step 200 described in method 20. As described in the earlier embodiment, the mobile application may be a separate application or integrated with an existing application running on the mobile phone 2. In one embodiment, the user is further required to register his or her mobile phone 2 with the service provider, for example, by providing his or her mobile phone number.

At step 401, a bank representative (i.e. a calling party) submits an electronic request to the authentication server 3 in connection with a call to be made to a customer, prior to making the call. The customer may be an existing or potential customer of the bank. The electronic request typically identifies a phone number of a communication device (e.g. the mobile phone 2) of the party to be called. According to this particular example, the electronic request is submitted via the registered communication terminal 6 of the bank representative.

In response to the electronic request, the authentication server 3 generates a one-time-password (OTP) in connection with the call for transmission to the bank representative. At step 402, the OTP is received by the bank representative via the registered communication terminal 6. In some embodiments, the authentication server 3 verifies an identity of the calling party which submits the electronic request. For example, the authentication server 3 may process requests submitted by calling parties and/or their associated communication terminals which are pre-authorized by the authentication server 3. In another embodiment, the authentication server 3 may require the calling party to provide necessary credentials for identity verifications before allowing access to the authentication server 3. The authentication server 3 may be operated by the bank.

At step 403, the authentication server 3 is configured to transmit a notification to the communication terminal (e.g. the mobile phone 2 of the customer) identified in connection with the electronic request. The notification includes a matching OTP and an identity of the bank for authenticating the calling party which submits the electronic request. In this example, the matching OTP received by the called party is identical to the OTP received by the calling party. The notification may further include the identity of a subdivision of the bank from which the electronic request was sent to the authentication server 3. In some embodiments, the notification may indicate a time duration, for example one hour, within which the user should expect the incoming call, (i.e. for which the OTP is valid). The notification may include instructions to the user on how to verify that the incoming call is from an authorized and/or authentic calling party. For example, the instructions may inform the user to verifying the identity of the calling party using the OTP and/or other given information provided in the notification. The instructions may also inform the user that in case of any mismatch in information, the call would not have been originated from the bank's call center, and alert the user not share any information and/or to disconnect the call if needed.

The notification may be transmitted as a push notification via the mobile application installed on the mobile phone 2 of the user. In a variant embodiment, the notification may be in a form of a text message sent via SMS to the mobile phone 2 which the user registered with the bank or the authentication server 3. In another example, an email notification may be sent to an email address which the user has registered with the bank or the authentication server 3.

At step 404, the user' mobile phone 2 receives an incoming call from the bank representative, and displays the caller's information to the user as an initial step of authenticating the caller. After the user accepts the call, the user may request the calling party to authenticate his or her identity by providing the OTP and identity information of the bank at step 405 for authentication. If the provided information is consistent with the notification the user received from the authentication server 3, the caller identified is verified at step 406. Otherwise, if the caller fails to produce the correct information, the user may disconnect the phone call at step 407.

Figure 5:
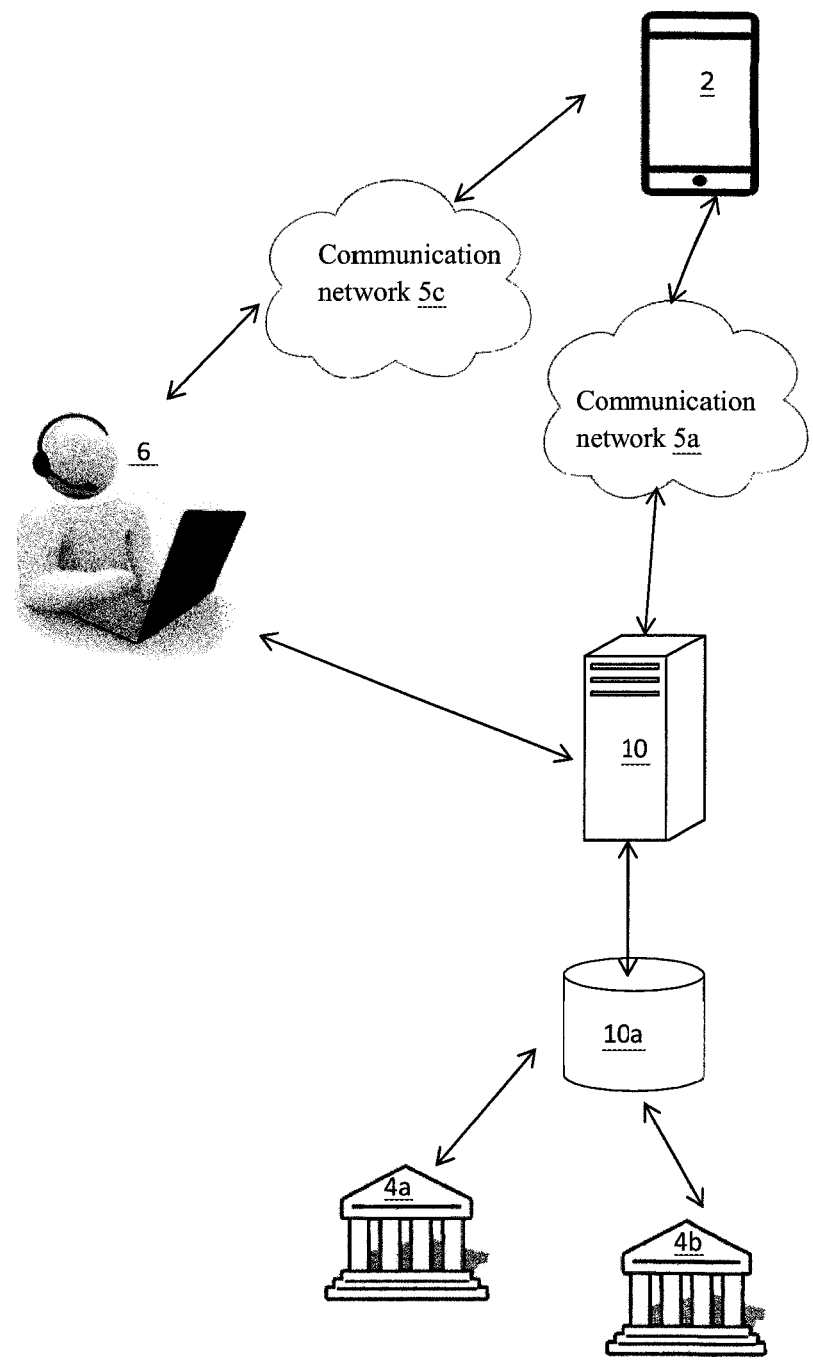
FIG. 5 shows another network which is suitable for performing a method according to the present disclosure.

In some of the embodiments described above, the phone directory server 1 is operated by the bank 4 and stores the contact information associated with the bank 4. In a variant embodiment as shown in FIG. 5, an aggregator server 10 stores contact information of a plurality of organizations such as banks 4a, 4b. The aggregator server 10 may be operated by a payment processing organization such as MasterCard, having suitable processing apparatus. For example, the aggregator server 10 may leverage upon existing platforms such as MasterPass™ and/or its one-time-password platform to perform the function of the call authentication server 3 as described above. As also shown in the embodiment depicted by FIG. 5, the phone directory database 10a may be located remote to the aggregator server 10 but made accessible via a wireless communication network.

It will also be understood by a skilled person in the art that although FIG. 1 illustrates that only one mobile phone 2 is communication with the phone directory server 1, the phone directory server 1 may provide the contact information stored by the phone directory database 1a to a plurality of communication devices, for example to registered mobile phones of multiple users who have subscribed to the call authentication service. It will be understood that in another embodiment, the user's communication device may be a smart watch, a tablet computer, or the like, which is capable of functioning as a communication terminal to delivery voice communication.

Figure 6:
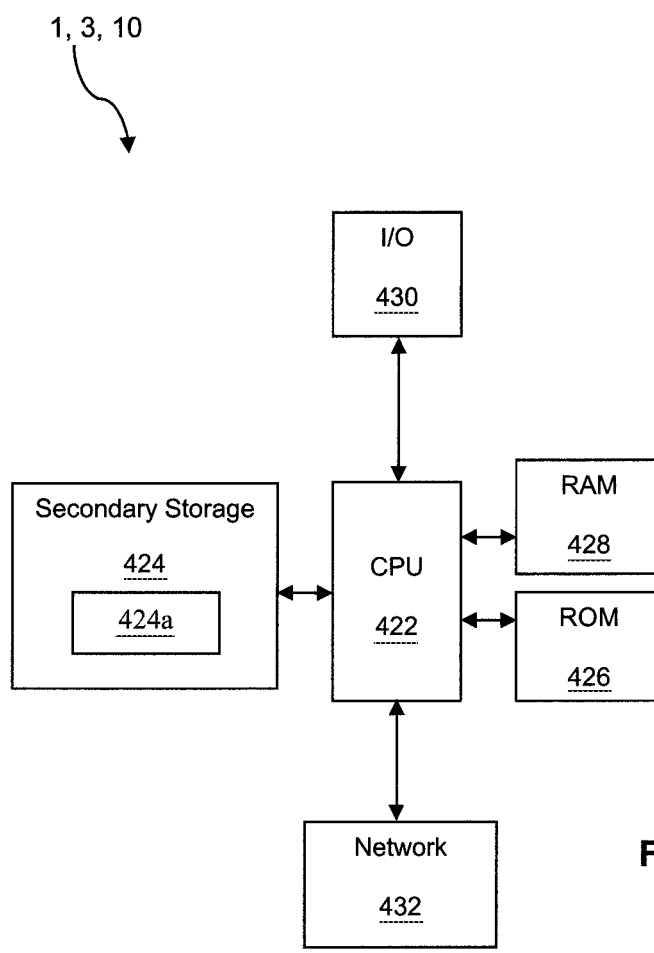
FIG. 6 shows the technical architecture of a server of the computerized network of FIG. 1.

FIG. 6 is a block diagram showing a technical architecture of a server computer (e.g. the phone directory server 1, the call authentication server 3 or the aggregator server 10) suitable for implementing the present method.

The technical architecture includes a processor 422 (which may be referred to as a central processor unit or CPU) that is in communication with memory devices including secondary storage 424 (such as disk drives), read only memory (ROM) 426, and random access memory (RAM) 428. The processor 422 may be implemented as one or more CPU chips. The technical architecture may further include input/output (I/O) devices 430, and network connectivity devices 432.

The secondary storage 424 typically includes one or more disk drives or tape drives and is used for non-volatile storage of data and as an over-flow data storage device if RAM 428 is not large enough to hold all working data. Secondary storage 424 may be used to store programs which are loaded into RAM 428 when such programs are selected for execution.

In this embodiment, the secondary storage 424 has a processing component 424a including non-transitory instructions operative by the processor 422 to perform various operations of the method of the present disclosure. The ROM 426 is used to store instructions and perhaps data which are read during program execution. The secondary storage 424, the RAM 428, and/or the ROM 426 may be referred to in some contexts as computer readable storage media and/or non-transitory computer readable media.

I/O devices 430 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 432 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 432 may enable the processor 422 to communicate with the Internet or one or more intranets. With such a network connection, it is contemplated that the processor 422 might receive information from the network, or might output information to the network in the course of performing the above-described method operations. Such information, which is often represented as a sequence of instructions to be executed using processor 422, may be received from and outputted to the network, for example, in the form of a computer data signal embodied in a carrier wave.

The processor 422 executes instructions, codes, computer programs, scripts which it accesses from hard disk, floppy disk, optical disk (these various disk based systems may all be considered secondary storage 424), flash drive, ROM 426, RAM 428, or the network connectivity devices 432. While only one processor 422 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third-party provider.

It is understood that by programming and/or loading executable instructions onto the technical architecture, at least one of the CPU 422, the RAM 428, and the ROM 426 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 7:
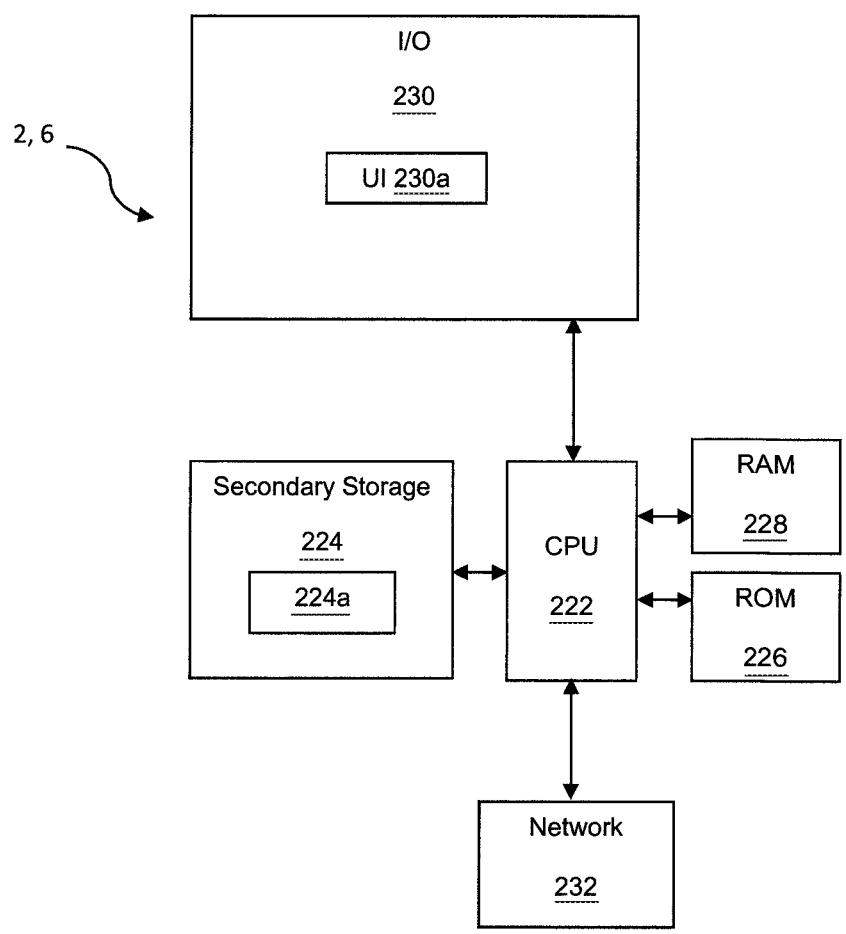
FIG. 7 shows the technical architecture of a communication device of the system of FIG. 1.

FIG. 7 is a block diagram showing a technical architecture of a communication device (e.g. the user's mobile phone 2 or the registered communication terminal 6). The technical architecture includes a processor 222 (which may be referred to as a central processor unit or CPU) that is in communication with memory devices including secondary storage 224 (such as disk drives or memory cards), read only memory (ROM) 226, and random access memory (RAM) 228. The processor 222 may be implemented as one or more CPU chips. The technical architecture further includes input/output (I/O) devices 230, and network connectivity devices 232.

The I/O devices include a consumer interface (UI) 230. The UI 230a may include a screen in the form of a touch screen, a keyboard, a keypad, or other known input device.

The secondary storage 224 typically includes a memory card or other storage device and is used for non-volatile storage of data and as an over-flow data storage device if RAM 228 is not large enough to hold all working data. Secondary storage 224 may be used to store programs which are loaded into RAM 228 when such programs are selected for execution.

In this embodiment, the secondary storage 224 has a processing component 224a, including non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Whilst the foregoing description has described exemplary embodiments, it will be understood by those skilled in the art that many variations of the embodiment can be made within the scope and spirit of the present disclosure. For example, the registered communication terminal 6 may be a mobile phone of the bank representative. While in some of the embodiments described above, the bank representative requests for the OTP via the registered communication terminal 6 and makes an outgoing call using the same registered communication terminal 6. It is also envisaged the OTP may be requested by another registered communication terminal or any other communication device.

What is claimed is:

1. A method performed by a server for authenticating a calling party for a call session over a communications network between a first communication terminal associated with the calling party and a second communication terminal associated with a called party, wherein the calling party is one of a plurality of calling parties associated with an organization, the method comprising:

storing contact information associated with a plurality of registered communication terminals within a database in communication with the server, wherein each of the plurality of registered communication terminals is designated by the organization for making outgoing calls by at least one of the plurality of calling parties, and wherein the plurality of registered communication terminals includes the first communication terminal;

retrieving the contact information from the database, the contact information comprising an association between a plurality of phone numbers of the plurality of registered communication terminals and an identity of the associated organization; and transmitting, in response to receiving an automatic download request from the second communication terminal, the contact information to the second communication terminal, to cause information representing the identity of the associated organization to be displayed by the second communication terminal in response to the second communication terminal receiving an incoming call from any of the plurality of phone numbers associated with the plurality of registered communications terminals.

2. The method according to claim 1 further comprising receiving an electronic request from the calling party and transmitting a one-time-password (OTP) to the calling party in response to the electronic request, the method further comprising transmitting a notification comprising a corresponding OTP to the second communication terminal.

3. The method according to claim 2, wherein the notification comprises a time duration for which the OTP is valid.

4. The method according to claim 2, wherein the notification comprises the information representing the identity of the associated organization.

5. The method according to claim 1 further comprising retrieving updated contact information from the database and transmitting the updated contact information to the second communication terminal at a pre-defined time interval.

6. The method according to claim 1 further comprising causing an address book of the second communication terminal to store the contact information.

7. The method according to claim 1 further comprising registering the called party, prior to the step of receiving the automatic download request, by storing user information of the called party including at least one of a full name of the called party, a residential address of the called party, an e-mail address of the called party, and a mobile phone number associated with the called party.

8. An apparatus for authenticating a calling party for a call session over a communications network between a first communication terminal associated with the calling party and a second communication terminal associated with a called party, wherein the calling party is one of a plurality of calling parties associated with an organization, the apparatus comprising a processor and a data storage device storing program instructions, and wherein the program instructions are operative to cause the processor to:

store contact information associated with a plurality of registered communication terminals within a database in communication with the server, wherein each of the plurality of registered communication terminals is designated by the organization for making outgoing calls by at least one of the plurality of calling parties, and wherein the plurality of registered communication terminals includes the first communication terminal;

retrieve the contact information from the database, the contact information comprising an association between a plurality of phone numbers of the plurality of registered communication terminals and an identity of the associated organization; and transmit, in response to receiving an automatic download request from the second communication terminal, the contact information to the second communication terminal, to cause information representing the identity of the associated organization to be displayed by the second communication terminal in response to the second communication terminal receiving an incoming call from any of the plurality of phone numbers associated with the plurality of registered communications terminals.

9. The apparatus according to claim 8, wherein the instructions are operative to cause the processor to receive an electronic request from the calling party and transmit a one-time-password (OTP) to the calling party in response to the electronic request, and wherein the instructions are operative to cause the processor to further transmit a notification comprising a corresponding OTP to the second communication terminal.

10. The apparatus according to claim 9, wherein the notification comprises the information representing the identity of the associated organization.

11. The apparatus according to claim 8, wherein the instructions are operative to cause the processor to retrieve updated contact information from the database and transmitting the updated contact information to the second communication terminal at a pre-defined time interval.

12. The apparatus according to claim 11 further comprising the database, wherein the instructions are operative to cause the processor to update the database to store the updated contact information.

13. The apparatus according to claim 8, wherein the instructions are operative to cause the processor to cause an address book of the second communication terminal to store the contact information.

14. A method for authenticating a calling party for a call session over a communications network between a first communication terminal associated with the calling party and a second communication terminal associated with a called party, wherein the calling party is one of a plurality of calling parties associated with an organization, the method being performed by the second communication terminal, said second communication terminal having a user interface, the method comprising:

transmitting an automatic download request to a server;

receiving, from a database in response to the automatic download request, contact information associated with a plurality of registered communication terminals, wherein each of the plurality of registered communication terminals is designated by the organization for making outgoing calls by at least one of the plurality of calling parties, and wherein the plurality of registered communication terminals includes the first communication terminal, the contact information comprising an association between a plurality of phone numbers of the plurality of registered communication terminals and an identity of the associated organization; and in response to receiving the incoming call from any of the plurality of phone numbers associated with the plurality of registered communications terminals,
determining the identity of the organization using the contact information, and
displaying information representing the identity of the organization via the user interface.

15. The method according to claim 14 further comprising receiving, prior to receiving the incoming call, a notification for authenticating the calling party, said notification comprising a one-time-password (OTP) and the information representing the identity of the organization.

16. The method according to claim 14 further comprising storing the contact information in an address book of the second communication terminal.

17. A communication device comprising a processor, a user interface, and a data storage device storing program instructions, the program instructions operative to cause the processor to:

transmit an automatic download request to a server;
receive, from a database in response to the automatic download request, contact information associated with a plurality of registered communication terminals, wherein each of the plurality of registered communication terminals is designated by an organization for making outgoing calls by at least one of a plurality of calling parties associated with the organization, the contact information comprising an association between a plurality of phone numbers of the plurality of registered communication terminals and an identity of the associated organization; and in response to receiving an incoming call from any of the plurality of phone numbers associated with the plurality of registered communications terminals,
determine the identity of the associated organization using the contact information, and
display information representing the identity of the organization via the user interface.

18. The communication device according to claim 17, wherein the program instructions are operative to cause the processor to receive a notification for authenticating the one of the plurality of calling parties making the incoming call, said notification comprising a one-time-password (OTP) and the information representing the identity of the organization.

19. The communication device according to claim 17, wherein the program instructions are operative to cause the processor to store the contact information in an address book of the communication device.

20. A method performed by a server for authenticating a calling party for a call session between a first communication terminal associated with the calling party and a second communication terminal associated with a called party, the calling party is one of a plurality of calling parties associated with an organization, the method comprising:

storing contact information associated with a plurality of registered communication terminals within a database in communication with the server, wherein each of the plurality of registered communication terminals is designated by the organization for making outgoing calls by at least one of the plurality of calling parties, and wherein the plurality of registered communication terminals includes the first communication terminal;
receiving an electronic request from the calling party, the electronic request associated with the called party;
transmitting, in response to the electronic request, a notification comprising a one-time-password (OTP) to the second communication terminal; and
transmitting a corresponding OTP to the calling party, for authenticating the calling party for an outgoing call made from the first communication terminal to the called party.

* * * * *